United States Patent [19]

Howell

[11] 4,304,878

[45] Dec. 8, 1981

[54] METHOD FOR TREATING POLYESTER RESIN SYSTEM WITH ORGANIC ACID TO SUPPRESS GEL-TIME DRIFT

[75] Inventor: Hilda Howell, Pittsburgh, Pa.

[73] Assignee: Koppers Company, Inc., Pittsburgh, Pa.

[21] Appl. No.: 61,413

[22] Filed: Jul. 27, 1979

[51] Int. Cl.³ .............................................. C08G 63/76
[52] U.S. Cl. ........................................ 525/17; 260/16;
    260/28 R; 260/40 R; 525/13; 525/25; 525/27;
    525/39; 525/49
[58] Field of Search .................... 525/39, 48, 13, 5, 17,
    525/25, 27; 260/45.85 T, 16, 40 R, 28 R

[56] References Cited

U.S. PATENT DOCUMENTS 2,664,413 12/1953 Parker .......................... 260/45.85 T

FOREIGN PATENT DOCUMENTS 974214 11/1964 United Kingdom ................. 525/39

*Primary Examiner*—J. Ziegler
*Attorney, Agent, or Firm*—J. Timothy Keane; Oscar B. Brumback

[57] ABSTRACT

A method is disclosed for treating polyester resin systems to suppress gel-time drift for the useable storage life of the resin system. The method comprises contacting a solution containing a polyester binder with an organic acid either between formulation stages or after formulation of the resin system. Typically useful organic acids include aromatic dicarboxylic acids such as phthalic acid and unsaturated aliphatic dicarboxylic acids such as fumaric acid. Comparative data for gel times of polyester resin system samples treated according to the disclosed method show suppression of gel-time drift to as low as 6 percent of the gel-time drift of counterpart untreated resin system samples.

33 Claims, 5 Drawing Figures

FIG. 1

AVERAGE GEL-TIME DRIFT FOR UNTREATED AND PHTHALIC ACID PRE-TREATED SAMPLES OF SIX LOTS OF PROMOTED POLYESTER RESIN SYSTEM
( EXAMPLE I )

FIG. 2

AVERAGE GEL-TIME DRIFT FOR UNTREATED AND PHTHALIC ACID POST-TREATED SAMPLES OF SIX LOTS OF PROMOTED POLYESTER RESIN SYSTEM
( EXAMPLE II )

FIG. 4

GEL-TIME DRIFT FOR UNTREATED AND PHTHALIC ACID
TREATED SAMPLES OF
HIGH REACTIVITY PROMOTED POLYESTER RESIN SYSTEM
(EXAMPLE IV)

FIG. 5

GEL-TIME DRIFT FOR UNTREATED AND PHTHALIC ACID
TREATED SAMPLES OF
HIGH REACTIVITY PROMOTED POLYESTER RESIN SYSTEM
(EXAMPLE $\overline{\text{V}}$)

METHOD FOR TREATING POLYESTER RESIN SYSTEM WITH ORGANIC ACID TO SUPPRESS GEL-TIME DRIFT

BACKGROUND OF THE INVENTION

Polyester resin systems are useful in a multitude of molding and coating applications. Of particular interest herein are polyester resin systems having components and additives which allow curing at low energy levels, provide improved shelf life and reduce gel-time drift.

Important parameters that desirably should remain fairly constant for the useful life of a resin system during a storage period, or its "shelf life," are the gel and curing times of the resin system. Variations in the reaction time for gelling, and subsequent curing, of a polyester resin system during storage may be characterized as "gel-time drift." These variations are typically measured as the difference between a gel time after a period of storage and a gel time just after formulation of the resin system. Usually, polyester systems in storage for long periods acquire longer gel or curing times. Some polyester systems, however, may, after long storage periods, exhibit curing times which are shorter than the initial curing time of a freshly manufactured batch. Typical commercially-available polyester systems often have gel-time drifts in the range of minus 50 percent to plus 200 to 300 percent. Such variations frequently cause intolerable problems during molding or coating application processes where predictability of gel time is a necessity.

Gel-time drift of a polyester resin system presents a complex problem inasmuch as there may be several interrelated factors responsible, namely, physical parameters of resin formulation, chemical composition of the resin system, the presence of contaminants, and shipping, handling and storage conditions. The problem of gel-time drift is particularly acute for the more highly reactive resin systems which may contain chemical promoters for accelerating the rate of gelling or for lowering the temperature of reaction as may be required in a casting operation. It has been found that a promoted polyester system may not only exhibit large variations in gel-time drift, but gel-time drift may vary widely between samples within a single batch of a polyester formulation due to different storage and handling conditions.

There have been several additives found for controlling or suppressing gel-time drift in polymerizable molding and coating compositions, most of the compositions being of the polyester type. Some of these additives are metallic salts such as the alkaline-earth metal salts disclosed for use with polyester resins in U.S. Pat. No. 3,367,905; or the additives comprise organo-metallic salts such as phthalimide-potassium salts for use as stabilizers disclosed for use with phthalate-polyol transesterification products in German Offenlegenschrift No. 2,556,317. Other compounds have been used to compensate for the presence of special components. For example, U.S. Pat. No. 4,088,710 discloses that gel time may be reduced for an unsaturated polyester thermosetting resin, which contains a gel-time lengthening vinyl-phosphonate flame retardant, by adding an effective amount of maleic anhydride to the polyester. In British Pat. No. 1,281,891, unsaturated polyester resin containing a cobalt salt promoter is disclosed as stabilized against gel-time drift by the addition of bis(2-hydroxyethyl)sulfide. Certain amine-containing compounds have been used as gel-time drift stabilizers. For example, improvements in stability and gel-time drift have been found for polyester resin incorporating a combination of two or more quinone-type inhibitors with an aryl ethanolamine, as disclosed in Werts, A. P., *Annual Conf. of Soc. Plast. Ind., Reinf. Plast./Compos. Div., Proc.*, 26th, 1971, 4-C, 1-10. A decrease in gel-time drift has been reported for a polyester resin system containing a cobalt-dipyridyl promoter combination [Goodman et al., *J. Paint Tech.*, 43, 59 (1971)]. It was noted in Kozyreva, H. G. et al., *Zh. Prikl. Khim. (Leningrad)*, 1976, 49(4), 920-1, that the degree of cross-linking in unsaturated polyesters may be affected by the presence of an intiator system containing aminoesters of methacrylic acid. In U.S.S.R. Pat. No. 535,317 to Saifullin et al., there is disclosed a polyurethane prepolymer composition having improved storage stability, which composition comprises free NCO groups and a catalyst provided by a solid complex salt of a tertiary amine and a carboxy-containing compound selected from polyester acids and acids having dissociation constants in a range of $1 \times 10^{-3}$ to $6 \times 10^{-6}$.

The problem of a gel-time drift is particularly acute for polyester resin systems containing a number of chemical-or-physical property-altering additives in combination, such as initiators for initiating curing, reaction-rate promoters for accelerating curing and inhibitors for preventing premature curing of a polyester resin during storage. Also, the presence of fillers, pigments, dyes, thixotropic additives, reinforcement materials, flame retardants, waxes, or lubricants may further contribute to gel-time drift in an unpredictable or uncontrollable manner. There remains, therefore, need for methods of treatment which will reduce gel-time drift and stabilize curing behavior in polyester resin systems, especially in those polyester resin systems containing several property-altering additives.

SUMMARY OF THE INVENTION

A curable polyester resin system comprising unsaturated polymerizable material as provided by an unsaturated polyester binder and, optionally, one or more additive components for altering a physical or chemical property of the resin system, is found to have a stabilized gel time over its useful life by a method of treatment comprising the step of contacting the polyester binder of the resin system with an organic acid in an amount and for a period of time effective to suppress gel-time drift for the useable shelf-life of the resin system as compared to an untreated counterpart resin system. The contacting step may comprise adding an organic acid to a monomer solution containing a polyester resin binder and thereafter mixing the organic acid and polyester resin binder in the solution. The mixing may be accomplished by practically any conventional method of mixing. The method of the invention may be further characterized by the step of removing the organic acid from contact with the polyester resin binder solution. The removing step may be accomplished by pressure filtering or by centrifugation of the mixture of organic acid and polyester resin binder and monomer solution.

For a polyester resin system comprising one or more property-altering additive components, the methods of the invention are still further characterized in that the contacting of the polyester binder solution with the organic acid may occur either before, or after, introducing the one or more property-altering components to the resin system.

The methods of the invention are particularly applicable to a polyester resin system having a promoter, such as a cobalt-containing compound, or an amine, or both a cobalt-containing compound and an amine in combination, as a property-altering additive component.

An advantage of the methods of the invention is that polyester resin systems are provided which are characterized by a usefully-extended shelf life because of suppression of gel-time drift. Thus a wide variety of resin systems may be employed in molding or coating applications where it is required that a gel time be predictable and vary insignificantly from the initial gel time which is characteristic of the resin system just after its manufacture. Polyester resin systems treated according to the methods of the invention exhibit after-storage gel-time drifts as low as 6 percent of gel-time drifts of untreated counterpart resin systems.

DETAILED DESCRIPTION OF THE INVENTION

Practically any polyester resin system may be treated by the methods of the invention to provide compositions having one or more of the aforementioned advantages. The term "polyester resin system" is intended to describe a mixture of components which provide a curable molding or coating composition containing polymerizable material as provided in part by a polyester binder and one or more of a variety of additive components for modifying physical or chemical properties of the compositions. The term "polyester binder" is a shortened version of the expression "unsaturated polyester thermosetting resin binder," and is intended to connote cross-linkable polyesterification material having a substantial amount of ethylenic unsaturation. The polyester binder may self-polymerize or may polymerize by reacting with polymerizable monomeric material containing ethylenic unsaturation. The binder or binder and monomer typically provide a significant portion of the mass of a film-forming coating, or of a cast or molded article, within which the one or more property-altering additive components may be dissolved or dispersed.

The terms "useful shelf life" and "useable storage life" are intended to connote a period of time following manufacture of a polyester resin system during which the polyester resin may perform adequately for its intended purpose whether it be for a coating, casting or molding application. The period of time may be as short as a few days to as long as several years, depending upon the type of polyester resin system and the particular intended use. For purposes of the present invention, suppression of gel-time drift over a period of several months is considered to be a workable period of time advantageous for many types of polyester compositions for a variety of purposes. It is understood that the degree of suppression of gel-time drift varies according to the type of polyester and the conditions of storage. Suppression of gel-time drift of resin systems formulated and treated according to the invention to within plus or minus 25 percent of gel-time drift of untreated counterpart resin systems for a period of two months or more is considered indicative of a high degree of success as to the workability of the invention. Any recognizable suppression of gel-time drift for a significant period of time when using the formulations and treatments of the invention is, however, considered to be of advantage and constitutes evidence of the workability of the invention.

Useful unsaturated polyester resin binders include practically any esterification product of a polybasic organic acid and a polyhydric alcohol, wherein either the acid or the alcohol, or both, provide the ethylenic unsaturation. Typical unsaturated polyesters are those thermosettable resins made from the esterification of a polyhydric alcohol, such as a glycol, with an ethylenically unsaturated polycarboxylic acid. Examples of useful ethylenically unsaturated polycarboxylic acids include maleic acid, fumaric acid, aconitic acid, itaconic acid, dihydromuconic acid, and halo and alkyl derivatives of such acids. Mixtures of unsaturated polycarboxylic acids may be used or only a single such acid may be employed. The anhydrides of these acids, where the anhydrides exist, are, of course, embraced by the term "acid," since the polyesters obtained therefrom are essentially the same whether the acid or anhydride is used in the reaction.

Polyhydric alcohols useful in preparing ethylenically unsaturated polyesters by reaction with one or more of the aforementioned unsaturated polycarboxylic acids include saturated polyhydric alcohols such as ethylene glycol, 1,3-propanediol, propylene glycol, 2,3- butanediol, 1,4-butanediol, 2-ethylbutane-1,4-diol, 1,5-pentanediol, 1,6-hexanediol, 1,7-heptanediol, 1,8-octanediol, 1,9-nonanediol, 1,10-decanediol, 2,10-decanediol, 1,4-cyclohexanediol, 1,4-dimethylolcyclohexane, 2,2-diethylpropane-1,3-diol, 2,2-dimethylpropane-1,3-diol (neopentyl glycol), 3-methylpentane-1,4-diol, 2,2-diethylbutane-1,3-diol, 4,5-nonanediol, diethylene glycol, triethylene glycol, dipropylene glycol, glycerol, pentaerythritol, erythritol, sorbitol, mannitol, 1,1,1-trimethylolpropane, trimethylolethane, 2,2-dimethyl-3-hydroxypropyl-2-2-dimethyl-3-hydroxypropionate, hydrogenated bisphenol-A and the reaction products of bisphenol-A with ethylene or propylene oxide.

Useful unsaturated polyester resins may be derived from the esterification of a saturated polycarboxylic acid with an unsaturated polyhydric alcohol. Examples of useful saturated polycarboxylic acids include oxalic acid, malonic acid, succinic acid, methylsuccinic acid, 2,2-dimethylsuccinic acid, 2,3-dimethylsuccinic acid, hexylsuccinic acid, glutaric acid, 2-methylglutaric acid, 3-methylglutaric acid, 2,2-dimethylglutaric acid, 3,3-dimethylglutaric acid, 3,3-diethylglutaric acid, adipic acid, pimelic acid, suberic acid, azelaic acid, sebaccic acid, phthalic acid, isophthalic acid, terephthalic acid, tetrachlorophthalic acid, tetrabromophthalic acid, tetrahydrophthalic acid, 1,2-hexahydrophthalic acid, 1,3-hexahydropthalic acid, 1,4-hexahydrophthalic acid, 1,1-cyclobutanedicarboxylic acid and trans-1,4-cyclohexanedicarboxylic acid. As in the case of the ethylenically unsaturated polycarboxylic acids, the anhydrides of the saturated acids, where anhydrides exist, are embraced by the term "acid" since the polyesters obtained therefrom are essentially the same.

Useful unsaturated polyhydric alcohols for reacting with the saturated polycarboxylic acids include ethylenic unsaturation-containing analogues of the aforementioned saturated alcohols, one such analogue, for example, being 2-butene-1,4-diol.

The polyester binder may contain amounts of saturated polyester material which may be prepared by reacting together one or more of the aforementioned saturated polycarboxylic acids with one or more of the aforementioned saturated alcohols. The polyester binder may contain amounts of polyester material derived from the reaction of a mixture of saturated acid and unsaturated acid with a saturated and/or unsaturated alcohol.

The polyester resin binder will generally comprise a significant component of the resin system and thus is typically present in an amount in a range from about 40 to about 90 percent by weight of the resin system. Useful resin systems may be formulated, however, which have a much greater range of polyester binder. Thus the amount of polyester binder in the resin system may range from about 10 to about 99 weight percent of the resin system.

Polymerization of the polyester materials during the gelling or curing of the composition can occur by any one of several mechanisms. Where unsaturated polyesters comprise a major portion of the resin system, crosslinking between sites of ethylenic unsaturation of the polyester backbone may provide a cured product. More often, the polyester resin system will contain a monomer such as styrene, which is copolymerizable with the polyester material. Other useful monomers include acrylate compounds having one or more sites of acrylic unsaturation.

Examples of suitable acrylic monomers include mono-acrylic compounds such as methyl acrylate, ethyl acrylate, propyl acrylate, butyl acrylate and methyl methacrylate, di-acrylic compounds such as diacrylates and dimethacrylates of ethylene glycol, propylene glycol, diethylene glycol, and bisphenol-A-diglycidyl ether, tri-acrylate compounds such as triacrylates and trimethyacrylates of glycerol, 1,1,1-trimethylolpropane and trimethylolethane, and tetra-acrylic compounds such as tetracrylates and tetramethacrylates of pentaerythritol and erythritol. Other useful monomer materials include N-vinyl-2-pyrrolidine, divinyl benzene, vinyl toluene, vinyl acetate and diallyl phthalate. The copolymerizable monomer material may be present in the resin system in an amount in a range from about 1 to about 90 percent by weight of the resin system.

The polyester resin system will typically include various additive components for modifying a physical or chemical property of the resin system. Examples of such additive components are inhibitors, promoters, initiators, inert fillers, pigments, dyes, thixotropic additives reinforcement materials, flame retardants, waxes and lubricants.

An inhibitor is included in a polyester resin system to retard polymerization of the polyester material during storage of the composition or to aid in moderating the gelling or curing process. It is believed that in free-radical catalyzed addition-polymerization reactions, for example, the inhibitor compound absorbs or deactivates free radicals generated spontaneously during storage of the resin system and for a short period after the cure initiator is added. Examples of useful inhibitors include quaternary ammonium salts as a class, and quinones and dihydric phenols, such as parabenzoquinone, methyl para-benzoquinone, hydroquinone, 3-isopropyl catechol and 4-tert-butyl catechol. Inhibitors may be present in a poyester resin system in an amount in a range from about 0.001 to about 0.1 weight percent of the resin system.

An initiator compound is included in a polyester resin system to catalyze polymerization. A polyester system containing ethylenically unsaturated compounds may polymerize by way of a free-radical initiated, addition-polymerization mechanism. Typical initiator compounds are organic peroxides and hydroperoxide which decompose to provide chain-initiating free radicals. Usually, room temperature initiators are added to the resin system just before intended use of the resin system, such as in a coating, casting or molding operation. Examples of suitable initiators are benzoyl peroxide, methyl ethyl ketone peroxide, tert-butyl perbenzoate, cumene hydroperoxide and dicumyl peroxide. Other initiator compounds may include azo-type compounds, such as azo-bis-isobutyonitrile. One or more initiators may be present in a polyester resin system in an amount in a range from about 0.1 to about 3 weight percent of the resin system.

A promoter or accelerator may be included in a polyester resin system to aid in catalyzing the polymerization process. For example, in many molding or coating operations it may be desirable to initiate polymerization without the application of heat to the composition. A promoter compound typicaly aids in lowering the threshold temperature at which free radicals may be made available for initiating addition polymerization. Examples of useful promoters are metal-containing compounds such as cobalt octoate, organic compounds containing vanadium, manganese, iron or nickel, tertiary amines such as diethylaniline, or a combination of both a metal-containing compound and a tertiary amine. Usually, a promoter compound or a combination of promoter compounds may be present in a polyester resin system in an amount in a range from about 0.01 to about 1 weight percent of the resin system.

Extender pigments, coloring pigments or dyes may also be included in a polyester resin system. Examples of extender pigments are silica, calcium carbonate, barium sulfate, talc, aluminum silicates, sodium aluminum silicates and potassium aluminum silicates. Examples of hiding pigments are titanium dioxide, antimony oxide, zirconium oxide, zinc sulfide and lithopone. Examples of coloring pigments are iron oxides, cadmium sulfide, carbon black, phthalocyanine blue, phthalocyanine green, indanthrone blue, ultramarine blue, chromium oxide, burnt umber, benzidine yellow, toluidine red and aluminum powder. When used, one or more of these additives may be present in the resin system in an amount in a range from about 1 to about 80 weight percent of the resin system.

One or more thixotropic materials may be added to provide thixotropic character to the resin system. Examples of such materials are fumed silica, castor oil based compositions (e.g., Thixatrol ST, Baker Castor Oil Company), Cab-O-Sil, carboxymethylcellulose, modified clays, 12-hydroxystearic acid, tetrabutyl orthotitanate and microcrystalline cellulose. When used, these materials are usually present in an amount in the range of from about 0.5 percent to about 15 percent by weight of polyester present.

A polyester resin system may be formulated by mixing together amounts of polyester binder and polymerizable monomer in proportion to give a viscosity and other physical properties suitable for a particular molding or coating application. The additive components may then be introduced into the polyester-monomer mixture simultaneously or serially with suitable agitation to disperse the additive components throughout the mixture.

Formulation and treatment of a polyester resin system in accordance with the method of the invention may be effected by either of two alternative procedures. In one method of treating a polyester resin system, the procedure comprises formulating a solution containing a polyester resin binder, usually an alkyd polyester dissolved in a reactive monomer, then contacting the binder solution with an organic acid, and thereafter removing the organic acid from contact with the polyester binder. Then one or more chemical-or-physical property-altering additive components may be introduced to, or mixed with, the polyester binder solution to form a treated polyester resin system. This procedure is denoted as the "pre-treatment" method of the invention. In another method of treating a polyester resin system, the procedure comprises formulating a polyester resin binder solution, mixing, or introducing, one or more soluble property-altering additive components into the polyester resin binder solution to form a resin system, then contacting the polyester resin system with an organic acid, and thereafter removing the organic acid from the polyester resin system. This procedure is denoted as the "post-treatment" method of the invention. Although either of the pre-treatment or post-treatment methods may be utilized to yield a polyester resin system having the advantages provided by the invention, it has been found that the post-treatment method reduces gel-time drift more than does the pre-treatment method.

In either of the pre-treatment or post-treatment procedures, the contacting step may be effected by adding the organic acid to the polyester binder solution, either before or after introducing the one or more property-altering additive components to the polyester binder solution, which addition of the organic acid may be to the polyester alone or as a part of a complete polyester resin system formulation. Then, completion of the contacting of polyester binder-organic acid components, or the complete polyester resin system-organic acid components, is effected by mixing of the components. Mixing may be accomplished by any conventional method of mixng provided that the organic acid is evenly distributed throughout the polyester binder solution or the completed polyester resin system.

In another embodiment of the invention, the contacting step may be effected by passing the polyester binder or the resin system over or through a bed or column containing the organic acid.

The contact time required may vary according to the type and viscosity of the polyester binder solution, the types and amounts of property-altering additive components for the post-treatment method, the temperature at which contacting takes place, the type and amount of organic acid selected for use in the treatment and the type of contacting apparatus employed.

When ordinary mixing procedures are used, typical mixing times range from about 0.1 hour to about 24 hours, although longer or shorter periods may be used effectively. For a polyester resin system having a viscosity in a range of about 5 to about 15 poises, having a polyester binder making up about 40 to about 50 weight percent of the polyester resin system and having about 0.5 to about 5 weight percent phthalic acid or fumaric acid added to the polyester binder or the resin system, mixing times from about 0.1 hours to about 8 hours are usually effective to achieve adequate distribution of the organic acid throughout the binder solution or the resin system.

After the described contacting step, the organic acid may be removed from contact with the polyester resin binder or the polyester resin system formulated with soluble additives. Typically, the organic acid selected for treating the polyester resin system will be practically insoluble in, or only slightly soluble in, the polyester binder solution or the polyester resin system. Thus, separation and removal of the organic acid is usually accomplished with little difficulty. Separation may be accomplished by centrifuging or filtration of the mixture of polyester binder or resin system. Pressure-filtration techniques may be used to advantage, especially for highly viscous polyester binders or resin systems. Usually, pressure-filtration is performed using an inert gas, such as nitrogen as the pressurizing gas. Also, separation may be accomplished by allowing the organic acid to settle out of the polyester binder solution or the polyester resin system and then decanting the binder solution or resin system from the organic acid.

In order to test the effectiveness of the procedures for separation and removal of the organic acid, acid values of the polyester resin binder or the resin system are usually measured just before addition of the organic acid and just after removal of the organic acid. Generally, effective removal of the organic acid will be indicated by an acid value measured after the removal step, being within about 25 percent of the acid value measured before addition of the organic acid to the polyester binder solution or resin system. Typically, acid values for polyester resin binder, measured with or without one or more of the specified property-altering additive components, will be less than 30. The acid value of a polyester resin binder may be obtained by conventional techniques known in the art.

An organic acid useful in the treatment methods of the invention may be an aliphatic or aromatic mono- or polycarboxylic acid, provided that the acid is selected, and is contacted with the polyester preferably in an amount, so that the acid value of the polyester binder solution or the polyester resin system after the contacting step is not greater than about 25 percent of the acid value measured before the contacting step. Aliphatic monocarboxylic acids include formic acid, acetic acid, propionic acid, butyric acid, valeric acid, caproic acid, caprylic acid, capric acid, lauric acid, myristic acid, palmitic acid, stearic acid, oleic acid, linoleic acid, linolenic acid, and cyclohexanecarboxylic acid. Aromatic monocarboxylic acids include phenylacetic acid, benzoic acid, o-toluic acid, m-toluic acid, p-toluic acid, salicylic acid and p-hydroxybenzoic acid. Examples of saturated aliphatic polycarboxylic acids which may be useful are oxalic acid, malonic acid, succinic acid, glutaric acid, adipic acid, pimelic acid, suberic acid, azelic acid and sebacic acid. Useful unsaturated aliphatic polycarboxylic acids include maleic acid and fumaric acid; the latter is a preferred unsaturated aliphatic polycarboxylic acid. Examples of aromatic polycarboxylic acids include phthalic acid, isophthalic acid, terephthalic acid, hemimellitic acid, trimellitic acid and trimesic acid; phthalic acid is an especially preferred aromatic dicarboxylic acid for use in the methods of the invention.

Generally, treatment of a polyester binder solution or polyester resin system with an organic acid may require use of the acid in an amount in a range from about 0.05 to about 5 weight percent based on the weight of the polyester system. Amounts in a range from about 0.5 weight percent to about 5 weight percent are preferred. It should be noted that treatment methods of the invention may utilize one or a plurality of the aforementioned organic acids to make up the specified weight percent of organic acid. The organic acid may be added alone or may be added with the copolymerizable monomer and then the monomer-acid mixture may be added to the polyester binder or the resin system. Also the organic acid may be furnished in the form of a corresponding mono- or diacid derivative, such as the half-acid derivative of a dicarboxylic acid and a tertiary amine.

The following examples set forth specific embodiments of the invention. The invention is not to be construed, however, as being limited to these embodiments for there are, of course, numerous possible variations and modifications. All parts and percentages of the examples as well as throughout the specification are by weight unless otherwise indicated. These examples demonstrate methods of treatment of a polyester resin system with an organic acid in accordance with the invention. In order to test the efficacy of the treatment methods, gel times for treated and untreated samples of a polyester resin system are measured according to the following general procedure:

A 50 gram sample of the resin system material and 0.5 percent by weight of methylethylketone peroxide catalyst (60 percent in dibutylphthalate solution) are placed in a disposable reaction vessel maintained at 25° C. and mixed with a stirring rod for one minute. After a five-minute period, the sample is stirred for 15 seconds and then allowed to stand undisturbed in the reaction vessel until the gel snap point is reached. The gel snap point is that point in the curing time at which the resin becomes rubbery and snaps from the stirring rod when the rod is lifted out of the resin mass.

EXAMPLE I

The following procedure demonstrates the "pre-treatment" method of the invention. Six individually prepared lots of an unsaturated polyester resin system are formulated by firstly mixing and reacting together the following components in the designated amounts to form a polyester resin binder.

| Component | Moles |
|---|---|
| phthalic anhydride | 2.0 |
| maleic anhydride | 1.0 |
| propylene glycol | 3.0+ |

The polyester resin binder of each lot is diluted with styrene to provide solutions having viscosities in a range from about 5.5 to 7 poises at 25° C. Triplicate sets of one-liter portions of each of the six lots of polyester resin binder solution are designated "untreated reference" batch lots, treated batch "A" lots and treated batch "B" lots. Phthalic acid in an amount of 2 percent by weight is added to each of batch "A" and "B" lots. Batch "A" lots are stirred for about 30 minutes at low speed on a Cowles mixer and then pressure-filtered under nitrogen through Fisher filter paper (Cat. No. 9-795A) to remove undissolved phthalic acid from the polyester resin binder solution. Batch "B" lots are sealed in closed containers and rolled mechanically for about 12 hours, then centrifuged and thereafter decanted so as to remove undissolved phthalic acid. Both batch "A" and "B" lots are observed to be clear, sparkling products. Acid values of the treated batch "A" and "B" lots remain within 12 percent of the acid values of the originally formulated polyester binder. To each of the treated "A" and "B" lots and to the untreated reference batch lots there is introduced a mixture of property-altering additive components comprising a cobalt octoate-diethylaniline promoter system and an inhibitor of specific types and in amounts to provide resin systems like those of commercially-available, proprietary polyester resin systems sold under the trade designation K-1060-5 by Koppers Company, Inc.

Figure 1:
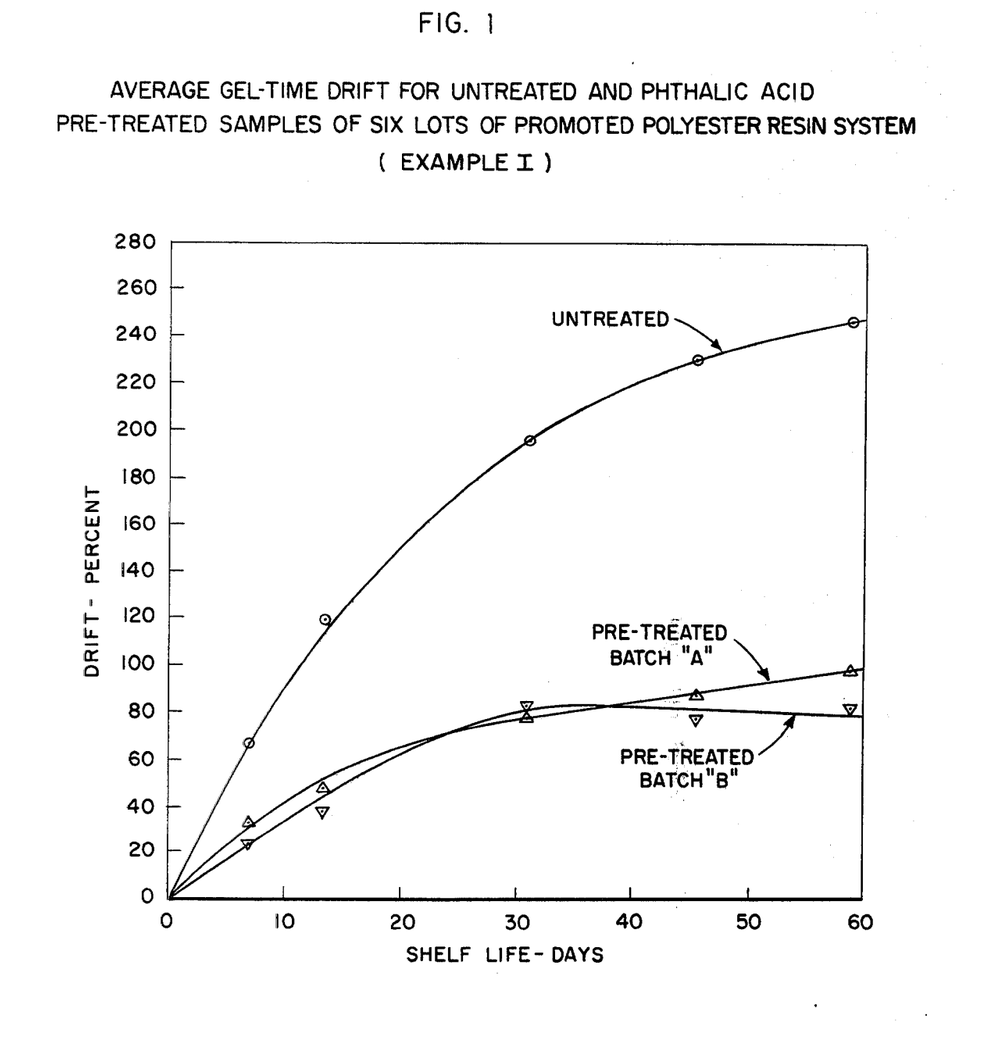
FIG. 1 is a graph showing average percent drift in gel times during a two-month storage period of samples of six individually prepared lots of a promoted, relatively low reactivity polyester resin system subjected to a phthalic acid "pre-treatment" method of the invention as compared to counterpart untreated reference samples of the same lots of the resin system, as set forth in Example I.

The treated batch "A" and "B" lots and the untreated reference batch lots are stored under dark in closed containers at room temperature. Over a period of 61 days and at 6 to 17 day intervals, gel times are measured for each of the lots by subjecting samples of the lots to the aforementioned gel snap point determination method. Gel time data are listed in Table I. In FIG. 1, there is plotted average percent change in gel time during the 61 day test period of the treated lots as compared to the untreated reference lots. For batch "A" and "B" lots subjected to the pre-treatment method of the invention, average gel-time drifts are observed to be reduced to 40 percent and 34 percent, respectively, of the gel-time drifts of the untreated reference lots.

TABLE I

Gel-Time Drift for Untreated and Phthalic Acid
Pre-Treated Samples of Six Lots of Promoted Polyester Resin System
(Example I)

| | Untreated Reference Samples | | | Pre-Treated Test Samples | | | | | |
|---|---|---|---|---|---|---|---|---|---|
| | | | | Batch "A" | | | Batch "B" | | |
| Shelf Life (days) | Lot Gel Time (min) | Ave. Lot Gel Time (min) | Ave. Gel-Time Drift from Initial (%) | Lot Gel Time (min) | Ave. Lot Gel Time (min) | Ave. Gel-Time Drift from Initial (%) | Lot Gel Time (min) | Ave. Lot Gel Time (min) | Ave. Gel-Time Drift from Initial (%) |
| 0,1 | 14.6 | | | 14.0 | | | 29.7 | | |
| 0,1 | 13.3 | | | 16.0 | | | 17.4 | | |
| 1 | 15.9 | 19.2 | — | 12.9 | 17.0 | — | 16.8 | 20.9 | — |
| 1 | 20.7 | | | 19.5 | | | 22.7 | | |
| 0 | 28.4 | | | 20.6 | | | 19.1 | | |
| 0 | 22.2 | | | 18.8 | | | 19.7 | | |
| 8 | 26.8 | | | 19.0 | | | 35.2 | | |
| 7 | 22.2 | | | 20.1 | | | 21.2 | | |
| 7 | 30.7 | | | 17.9 | 22.7 | 33.5 | 21.7 | 25.8 | 23.4 |
| 7 | 34.9 | 31.9 | 66.1 | 23.3 | | | 29.4 | | |
| 6 | 43.7 | | | 30.8 | | | 23.3 | | |
| 6,7 | 33.3 | | | 25.2 | | | 23.9 | | |
| 15 | 32.3 | | | 20.2 | | | 36.1 | | |
| 14 | 30.8 | | | 23.6 | | | 24.2 | | |
| 14 | 38.4 | 42.2 | 119.8 | 19.8 | 25.1 | 47.6 | 26.0 | 28.7 | 37.3 |
| 14 | 48.0 | | | 26.4 | | | 32.5 | | |
| 12 | 58.0 | | | 30.7 | | | 28.2 | | |
| 13,14 | 45.7 | | | 29.9 | | | 25.4 | | |
| 33 | 42.4 | | | 24.6 | | | 41.5 | | |
| 30 | 39.7 | | | 27.6 | | | 29.2 | | |
| 33 | 48.9 | 56.7 | 195.3 | 24.9 | 30.2 | 77.6 | 31.6 | 37.8 | 80.9 |
| 32 | 71.2 | | | 33.1 | | | 49.7 | | |
| 29 | 81.1 | | | 38.1 | | | 35.0 | | |
| 28,29 | 56.8 | | | 32.6 | | | 39.9 | | |
| 47 | 45.2 | | | 25.0 | | | 45.1 | | |
| 48 | 53.2 | | | 29.8 | | | 32.9 | | |
| 44 | 53.0 | 228.6 | 25.1 | 31.8 | 87.1 | 33.2 | 37.1 | 77.5 | |
| 46 | 83.5 | | | 34.9 | | | 44.3 | | |
| 43 | 79.8 | | | 40.4 | | | 36.8 | | |
| 46,47 | 63.7 | | | 35.6 | | | 30.4 | | |
| 60 | 47.2 | | | 26.3 | 45.0[1] | | | | |
| 59 | 56.4[2] | | | 35.9 | | | 35.4 | | |
| 58 | 52.9 | 66.2 | 244.8 | 27.5 | 33.6 | 97.6 | 37.9 | 38.3 | 83.3 |
| 61 | 83.5 | | | 33.8 | | | 43.2 | | |
| 57 | 88.2 | | | 40.7 | | | 35.9 | | |
| 57 | 68.8 | | | 37.2 | | | 32.2 | | |

[1]Value obtained at 67 days.
[2]Value obtained at 94 days.

EXAMPLE II

The following procedure demonstrates the "post-treatment" method of the invention. Six individually prepared lots of an unsaturated polyester resin system are formulated by firstly preparing polyester resin binder solutions having viscosities of 5.5 to 7 poises, as set forth in Example I. Then each of the polyester resin binder solutions is mixed with chemical-or-physical property-altering additive components comprising a cobalt octoate-diethylaniline promoter system and an inhibitor of specific types and in amounts to provide resin systems like those of commercially-available proprietary polyester resin systems sold under the trade designation K-1060-5 by Koppers Company, Inc. Triplicate sets of one-liter portions of each of the six lots of polyester resin system formulations are designated "untreated reference" batch lots and treated batch "A" and "B" lots. Phthalic acid in an amount of 2 percent by weight is added to each of batch "A" and "B" lots. Batch "A" lots are stirred for about 30 minutes at low speed on a Cowles mixer and then pressure filtered, as in Example I, to remove undissolved phthalic acid from the polyester resin system. Batch "B" lots are rolled mechanically in closed containers for about 12 hours, then centrifuged and thereafter decanted so as to remove undissolved phthalic acid from the polyester resin system. Acid values of the treated batch "A" and "B" lots remain within 12 percent of the acid values of the originally formulated polyester binder.

Figure 2:
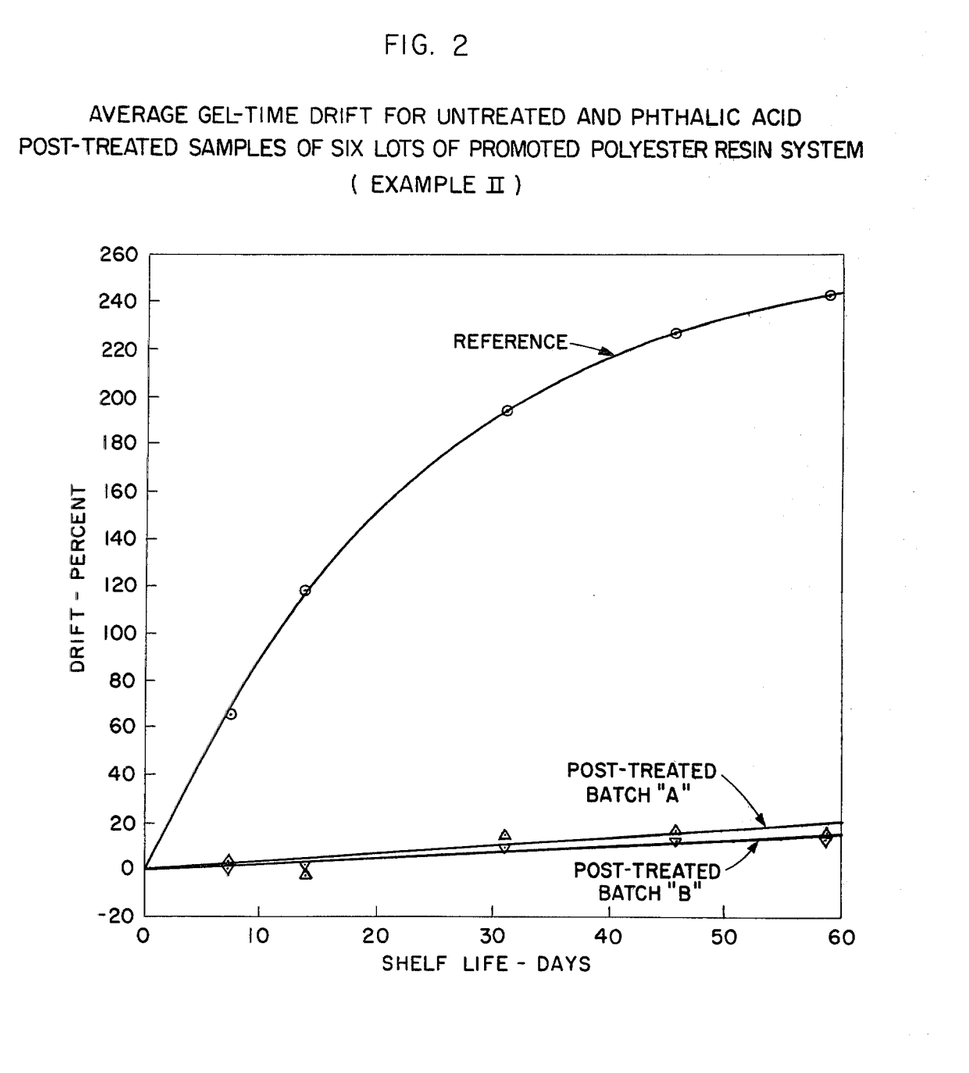
FIG. 2 is a graph showing average percent drift in gel times during a two-month storage period of samples of six individually prepared lots of a promoted, relatively low reactivity polyester resin system subjected to a phthalic acid "post-treatment" method of the invention as compared to counterpart untreated reference samples of the same lots of the resin system, as set forth in Example II.

The treated batch "A" and "B" lots and the untreated reference batch lots are stored under conditions, and with gel-time measurements being taken, as set forth in Example I. Gel-time data are listed in Table II. In FIG. 2 there is shown a comparative plot of average percent change in gel times of treated and untreated lots. For batch "A" and "B" lots subjected to the "post-treatment" method of the invention, average gel-time drifts are observed to be reduced to 6.5 percent and 6.2 percent, respectively, of the gel-time drifts of the untreated reference lots. Thus treatment of polyester resin systems according to the "post-treatment" method of the invention suppresses gel-time drifts by a factor of about 16.

TABLE II

Gel-Time Drift for Untreated and Phthalic Acid
Post-Treated Samples of Six Lots of Promoted Polyester Resin System
(Example II)

| | Untreated Reference Samples | | | Post-Treated Test Samples | | | | | |
|---|---|---|---|---|---|---|---|---|---|
| | | | | Batch "A" | | | Batch "B" | | |
| Shelf Life (days) | Lot Gel Time (min) | Ave. Lot Gel Time (min) | Ave. Gel-Time Drift from Initial (%) | Lot Gel Time (min) | Ave. Lot Gel Time (min) | Ave. Gel-Time Drift from Initial (%) | Lot Gel Time (min) | Ave. Lot Gel Time (min) | Ave. Gel-Time Drift from Initial (%) |
| 0,1 | 14.6 | | | 24.3 | | | 28.1 | | |
| 0,1 | 13.1 | | | 33.6 | | | 30.4 | | |
| 1 | 15.9 | 19.2 | — | 22.0 | 28.5 | — | 22.2 | 28.2 | — |
| 1 | 20.7 | | | 30.6 | | | 29.0 | | |
| 0 | 28.4 | | | 31.9 | | | 31.5 | | |
| 0 | 22.2 | | | 28.6 | | | 27.7 | | |
| 8 | 26.8 | | | 25.7 | | | 28.4 | | |
| 7 | 22.2 | | | 31.7 | | | 31.2 | | |
| 7 | 30.7 | 31.9 | 66.1 | 22.8 | 29.5 | 3.5 | 24.7 | 28.7 | 1.8 |
| 7 | 34.9 | | | 33.9 | | | 29.8 | | |
| 6 | 43.7 | | | 33.9 | | | 35.0 | | |
| 6,7 | 33.3 | | | 29.0 | | | 23.2 | | |
| 15 | 32.3 | | | 24.6 | | | 27.0 | | |
| 14 | 30.8 | | | 28.9 | | | 28.8 | | |
| 14 | 38.4 | 42.2 | 119.8 | 23.8 | 28.2 | −1.1 | 25.4 | 28.3 | 0.4 |
| 14 | 48.0 | | | 30.8 | | | 27.3 | | |
| 12 | 58.0 | | | 31.9 | | | 33.0 | | |
| 13,14 | 45.7 | | | 29.0 | | | 28.3 | | |
| 33 | 42.2 | | | 29.2 | | | 29.4 | | |
| 30 | 39.7 | | | 35.3 | | | 32.3 | | |
| 33 | 48.9 | 56.7 | 195.3 | 27.0 | 32.6 | 14.4 | 26.7 | 30.7 | 8.9 |
| 32 | 71.2 | | | 35.5 | | | 29.2 | | |
| 29 | 81.1 | | | 38.7 | | | 37.6 | | |
| 28,29 | 56.8 | | | 30.0 | | | 29.2 | | |
| 47 | 45.2 | | | 27.4 | | | 27.4 | | |
| 48 | 53.2 | | | 41.0 | | | 37.9 | | |
| 44 | 53.0 | 63.1 | 228.6 | 27.7 | 33.3 | 16.8 | 30.7 | 32.3 | 14.5 |
| 46 | 83.5 | | | 36.0 | | | 31.0 | | |
| 43 | 79.8 | | | 38.0 | | | 37.2 | | |
| 46,47 | 63.7 | | | 29.8 | | | 29.4 | | |
| 60 | 47.2 | | | 29.0 | | | 28.4 | | |
| 59 | 56.4[1] | | | 39.1 | | | 41.0[1] | | |
| 58 | 52.9 | 66.2 | 244.8 | 28.7 | 33.0 | 15.8 | 27.7 | 32.5 | 15.2 |
| 61 | 83.5 | | | 34.0 | | | 30.5 | | |
| 57 | 88.2 | | | 35.8 | | | 36.9 | | |
| 57 | 68.8 | | | 31.1 | | | 30.7 | | |

[1] Value obtained at 94 days.

EXAMPLE III

Figure 3:
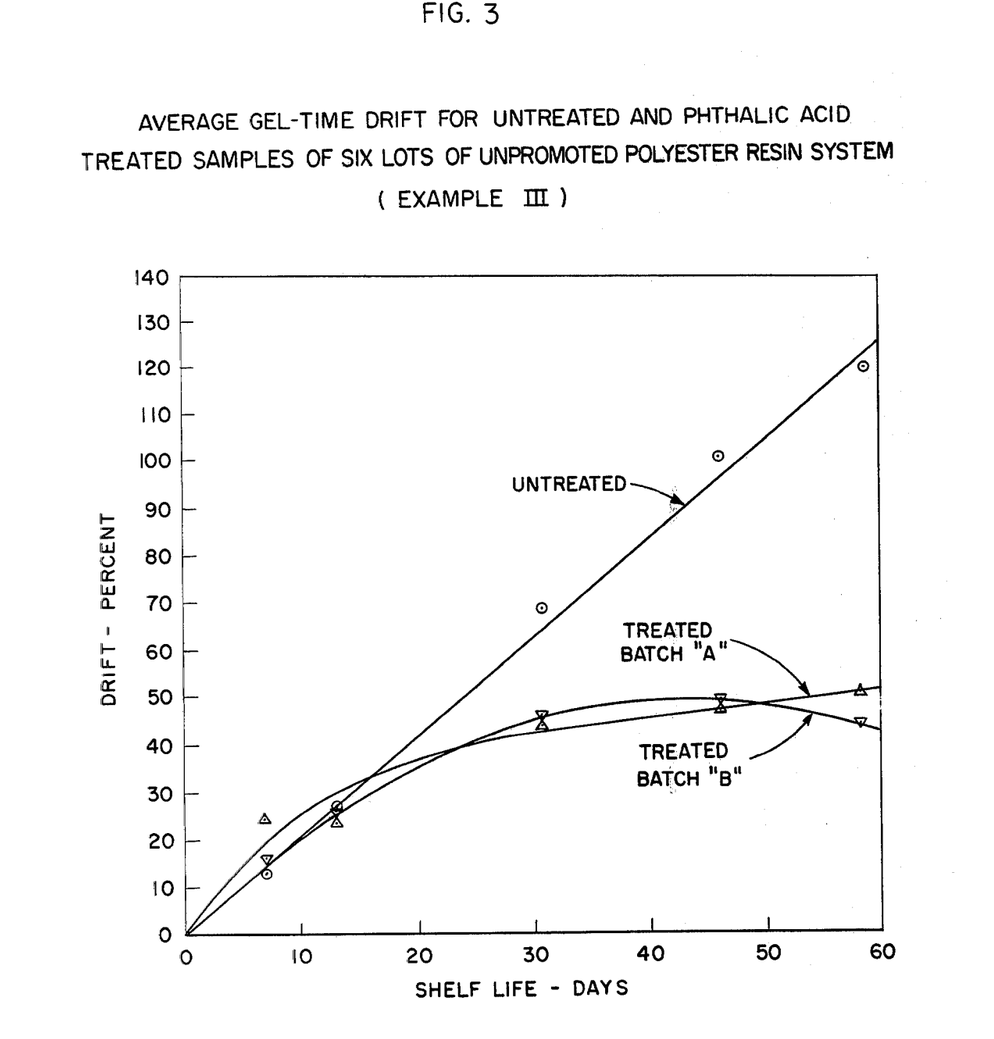
FIG. 3 is a graph showing average percent drift in gel times over a two-month storage period of samples of six individually prepared lots of an unpromoted, relatively low reactivity polyester resin system subjected to a phthalic acid treatment method of the invention as compared to counterpart untreated reference samples of the same lots of the polyester resin system, as set forth in Example III.

Six individually prepared lots of unsaturated polyester resin system are formulated by firstly preparing unsaturated polyester resin binder solutions as set forth in Example I. Then each of the polyester resin binders is mixed with chemical-or-physical property-altering components comprising an inhibitor to provide resin systems like those of commercially-available proprietary polyester resin systems sold under the trade designation K-1030-5 by Koppers Company, Inc. Absent from each of the resin system formulations is a promoter or promoter combination. Triplicate sets of one-liter portions of each of the six lots of the polyester resin system formulations are designated as "untreated reference" batch lots and treated batch "A" and "B" lots. Phthalic acid in an amount of 2 percent by weight is added to each of batch "A" and "B" lots. Batch "A" lots are stirred for about 30 minutes at low speed on a Cowles mixer and then pressure filtered, as in Example I, to remove undissolved phthalic acid from the polyester resin system. Batch "B" lots are rolled mechanically in closed containers for about 12 hours, then centrifuged and thereafter decanted, as in Example I, so as to remove undissolved phthalic acid from the polyester resin system. Acid values of the treated batch "A" and "B" lots remain within 12 percent of the acid values of the originally formulated polyester binder. The treated batch "A" and "B" lots are stored under conditions, and with gel-time measurements being taken, as set forth in Example I. Gel-time data are listed in Table III. In FIG. 3 there is shown a comparative plot of average percent change in gel times of treated and untreated lots. For batch "A" and "B" lots subjected to the treatment method of the invention, average gel-time drifts are observed to be reduced to 43 percent and 38 percent, respectively, of the gel-time drifts of the untreated reference lots.

TABLE III

Gel-Time Drift for Untreated and Phthalic Acid
Treated Samples of Six Lots of Unpromoted Polyester Resin System
(Example III)

| | Untreated Reference Samples | | | Treated Test Samples | | | | | |
|---|---|---|---|---|---|---|---|---|---|
| | | | | Batch "A" | | | Batch "B" | | |
| Shelf Life (days) | Lot Gel Time (min) | Ave. Lot Gel Time (min) | Ave. Gel-Time Drift from Initial (%) | Lot Gel Time (min) | Ave. Lot Gel Time (min) | Ave. Gel-Time Drift from Initial (%) | Lot Gel Time (min) | Ave. Lot Gel Time (min) | Ave. Gel-Time Drift from Initial (%) |
| 0,1 | 17.0 | | | 19.0 | | | 18.5 | | |
| 0,1 | 23.0 | | | 19.0 | | | 19.0 | | |
| 0,1 | 15.0 | 16.8 | — | 13.5 | 17.1 | — | 17.0 | 17.3 | — |
| 1 | 14.0 | | | 16.5 | | | 18.5 | | |
| 0 | 17.5 | | | 16.5 | | | 15.5 | | |
| 0 | 14.5 | | | 18.0 | | | 15.0 | | |
| 7,8 | 19.0 | | | 21.5 | | | 25.0 | | |
| 7 | 26.5 | | | 22.0 | | | 21.5 | | |
| 7 | 16.5 | 19.0 | 13.1 | 21.0 | 21.4 | 25.1 | 17.5 | 20.1 | 16.2 |
| 7 | 15.0 | | | 19.5 | | | 18.5 | | |
| 6 | 20.0 | | | 25.0 | | | 19.5 | | |
| 6,7 | 17.0 | | | 19.5 | | | 18.5 | | |
| 14,15 | 21.0 | | | 21.5 | | | 23.0 | | |
| 14 | 30.0 | | | 25.0 | | | 27.5 | | |
| 14 | 20.5 | 21.4 | 27.4 | 20.0 | 21.3 | 24.6 | 17.8 | 22.0 | 27.2 |
| 14 | 20.0 | | | 20.0 | | | 24.0 | | |
| 12 | 20.0 | | | 22.0 | | | 20.0 | | |
| 13,14 | 17.0 | | | 19.5 | | | 19.5 | | |
| 32,33 | 27.5 | | | 29.5 | | | 28.5 | | |
| 30 | 37.5 | | | 27.0 | | | 28.5 | | |
| 33 | 24.0 | 28.4 | 69.0 | 23.0 | 24.6 | 43.9 | 21.0 | 25.3 | 46.2 |
| 32 | 30.0 | | | 23.0 | | | 29.5 | | |
| 29 | 30.5 | | | 26.5 | | | 22.5 | | |
| 28,29 | 21.0 | | | 18.5 | | | 22.0 | | |
| 16,47 | 31.0 | | | 28.5 | | | 25.0 | | |
| 48 | 51.0 | | | 30.5 | | | 32.5 | | |
| 44 | 27.0 | 33.8 | 101.4 | 22.0 | 25.3 | 47.7 | 19.5 | 25.8 | 48.8 |
| 46 | 35.5 | | | 23.5 | | | 31.5 | | |
| 43 | 36.0 | | | 26.0 | | | 26.5 | | |
| 46,47 | 22.5 | | | 21.0 | | | 19.5 | | |
| 59,60 | 37.5 | | | 31.5 | | | 26.0 | | |
| 59 | 56.0 | | | 32.0 | | | 31.0 | | |
| 58 | 29.5 | 37.0 | 120.2 | 21.5 | 25.9 | 51.5 | 20.5 | 25.2 | 45.5 |
| 61 | 34.5 | | | 21.5 | | | 29.0 | | |
| 57 | 39.0 | | | 26.5 | | | 24.5 | | |
| 57 | 25.5 | | | 22.5 | | | 20.0 | | |

EXAMPLE IV

The following procedure demonstrates both pre-treatment and post-treatment methods of the invention. An unsaturated polyester resin system is formulated by firstly mixing and reacting together the following components in the designated amounts to form a polyester resin binder:

| Component | Moles |
|---|---|
| phthalic anhydride | 1 |
| maleic anhydride | 2 |
| propylene glycol | 3.3 |

Figure 4:
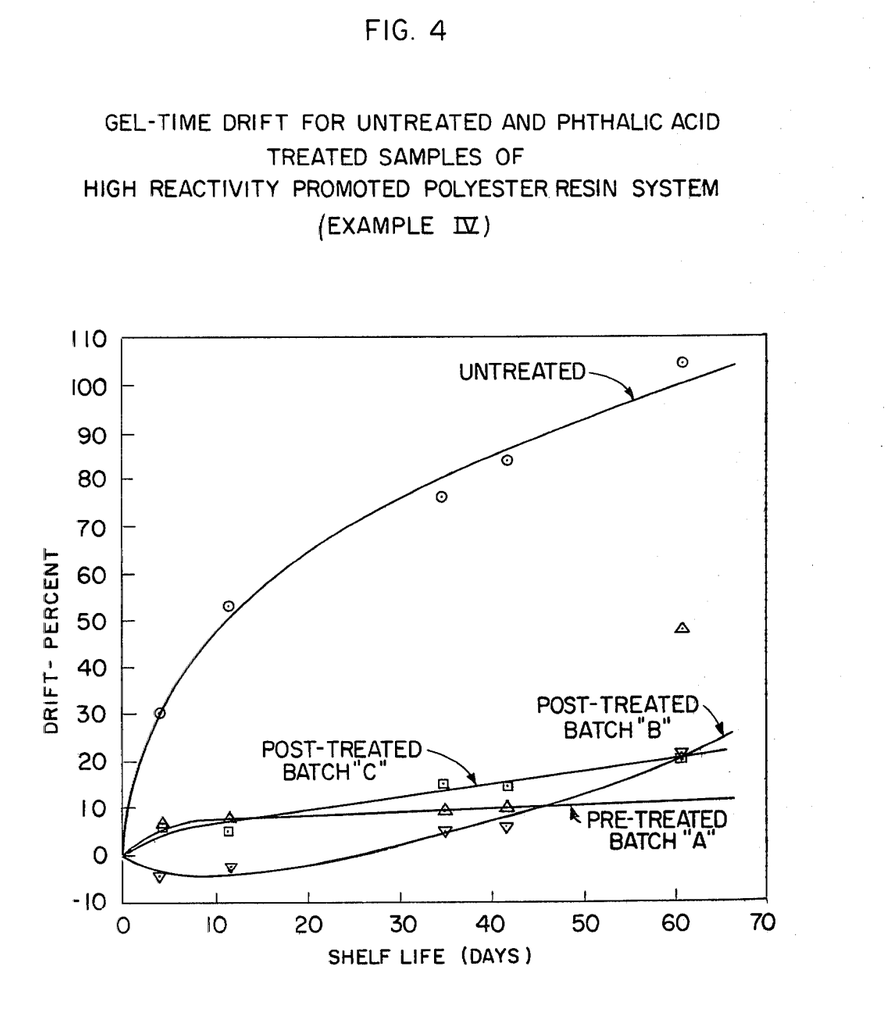
FIG. 4 is a graph showing percent drift in gel times over a two-month storage period of samples of a promoted, relatively high reactivity polyester resin system subjected to "pre-treatment" and "post-treatment" methods of the invention utilizing phthalic acid at three different levels as compared to counterpart untreated reference samples of the same lot of the resin system, as set forth in Example IV.

The polyester binder is diluted with styrene to provide a solution having a viscosity of about 5.5 to 7 poises at 25° C. Quadruplicate one-liter portions of the diluted polyester binder solution are designated "untreated reference" batch, pre-treated batch "A", post-treated batch "B" and post-treated batch "C". Phthalic acid in an amount of 3 percent by weight is added to batch "A" to form a mixture which is then rolled in a closed container for 12 hours and thereafter centrifuged; the supernatant liquid is decanted from the undissolved phthalic acid so as to remove the phthalic acid from contact with the polyester resin binder solution. Each of the batches "A", "B", "C" and the reference batch is mixed with chemical-or-physical property-altering additive components comprising a cobalt octoate-diethylaniline promoter system and an inhibitor of specific types and in amounts to provide resin systems like those of commercially-available, proprietary polyester resin systems sold under the trade designation B-304-60 by Koppers Company, Inc. Phthalic acid in an amount of 0.5 percent and 2 percent by weight is added to batches "B" and "C", respectively. Then batches "B" and "C" are rolled in closed containers for 12 hours and thereafter centrifuged; the supernatant liquid from each batch is then decanted from the undissolved phthalic acid so as to remove the phthalic acid from contact with the polyester resin systems. Acid values for batches "A", "B" and "C" remain within 12 percent of the acid values of the originally formulated polyester binder. Pre-treated batch "A", post-treated batches "B" and "C" and the untreated reference batch are stored under dark in closed containers at room temperature. Over a period of 62 days, gel times are measured at several intervals by subjecting samples of each of the batches to the aforementioned gel snap point determination method. Gel-time data are listed in Table IV. In FIG. 4 there is plotted gel-time drift of untreated and treated batches over the 62-day period. By the end of the test period gel-time drift for pre-treated batch "A" is observed to be reduced to 45 percent of the drift of the untreated reference batch, while gel-time drifts of post-treated batches "B" and "C" are reduced to 20 percent of the drift of the untreated reference batch.

as to remove the phthalic acid from contact with the polyester resin systems. Acid values remain within 12 percent of the acid values of the originally formulated polyester binder. Pre-treated batch "A", post-treated batches "B" and "C" and the untreated reference batch are stored under dark in closed containers at room temperature. Over a period of 62 days, gel times are mea-

TABLE IV

Gel-Time Drift for Untreated and Phthalic Acid Treated Samples of High Reactivity Promoted Polyester Resin System (Example IV)

| Shelf Life (days) | Untreated Reference | | Pre-treated Batch "A" | | Post-treated Batch "B" | | Post-treated Batch "C" | |
|---|---|---|---|---|---|---|---|---|
| | Gel-time (min) | Drift From Initial (%) | Gel-time (min) | Drift From Initial (%) | Gel-time (min) | Drift From Initial (%) | Gel-time (min) | Drift From Initial (%) |
| 0–2 | 8.2 | — | 12.5 | — | 16.4 | — | 23.6 | — |
| 3,5 | 10.7 | 30.5 | 13.4 | 7.0 | 15.7 | −4.2 | 25.2 | 6.8 |
| 10–13 | 12.5 | 52.4 | 14.4 | 8.0 | 16.0 | −2.4 | 24.8 | 5.1 |
| 35 | 14.4 | 75.6 | 15.6 | 9.6 | 17.2 | 4.9 | 27.1 | 14.8 |
| 42 | 15.0 | 82.9 | 17.0 | 24.8 | 17.3 | 5.5 | 26.9 | 14.0 |
| 60–62 | 16.7 | 103.7 | 18.4 | 47.2 | 19.9 | 21.3 | 28.5 | 20.8 |

EXAMPLE V

Figure 5:
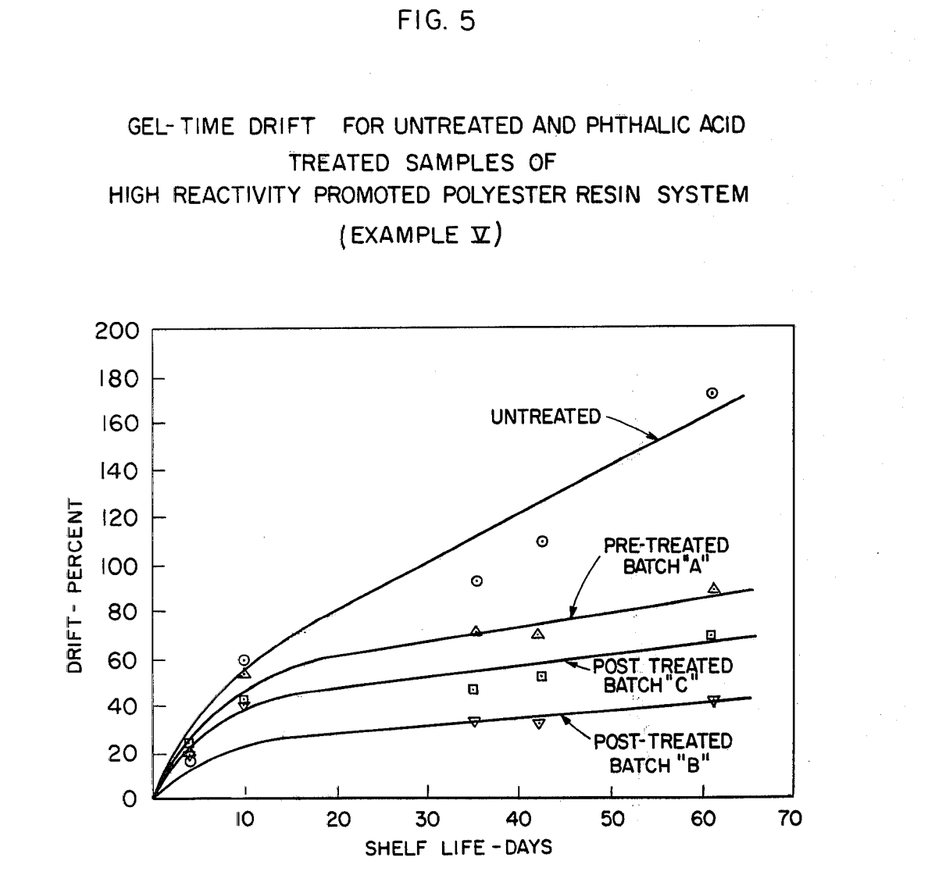
FIG. 5 is a graph showing percent drift in gel times over a two-month storage period of samples of a promoted, relatively high reactivity polyester resin system subjected to "pre-treatment" and "post-treatment" methods of the invention utilizing phthalic acid at three different levels as compared to counterpart untreated reference samples of the same lot of the resin system, as set forth in Example V.

The following procedure demonstrates both pre-treatment and post-treatment methods of the invention. An unsaturated polyester resin system is formulated by firstly preparing a polyester resin binder solution having a viscosity as set forth in Example IV. Quadruplicate one-liter portions of the polyester binder solution are designated "untreated reference" batch, pretreated batch "A", post-treated batch "B" and post-treated batch "C". Phthalic acid in an amount of 3 percent by weight is added to batch "A" to form a mixture which is then rolled in a closed container for 12 hours and centrifuged; the supernatant liquid is decanted from the undissolved phthalic acid so as to remove the phthalic acid from contact with the polyester resin binder. Each of the batches "A", "B", "C" and the reference batch is mixed with chemical-or-physical property-altering additive components comprising a cobalt octoate-diethylaniline promoter system and an inhibitor of specific types and in amounts to provide resin systems like those of commercially-available, proprietary polyester resin systems sold under the trade designation K-3010-5 by Koppers Company, Inc. Phthalic acid in an amount of 0.5 percent and 2 percent by weight is added to batches "B" and "C", respectively. Then batches "B" and "C" are rolled in closed containers for 12 hours and thereafter centrifuged; the supernatant liquid from each batch is then decanted from the undissolved phthalic acid so sured at several intervals by subjecting samples of each of the batches to the aforementioned gel snap point determination method. Gel-time data are listed in Table V. In FIG. 5 there is plotted gel-time drift for the untreated and treated batches over the 62-day period. By the end of the test period, gel-time drift for pre-treated batch "A" is observed to be reduced to 52 percent of the drift of the untreated reference batch, while gel-time drifts of post-treated batches "B" and "C" are reduced to 24 percent and 40 percent, respectively, of the drift of the untreated reference batch.

TABLE V

Gel-Time Drift for Untreated and Phthalic Acid Treated Samples of High Reactivity Promoted Polyester Resin System (Example V)

| Shelf Life (days) | Untreated Reference | | Pre-Treated Batch "A" | | Post-treated Batch "B" | | Post-treated Batch "C" | |
|---|---|---|---|---|---|---|---|---|
| | Gel-time (min) | Drift From Initial (%) | Gel-time (min) | Drift From Initial (%) | Gel-time (min) | Drift From Initial (%) | Gel-time (min) | Drift From Initial (%) |
| 0–2 | 18.3 | — | 18.5 | — | 20.7 | — | 22.5 | — |
| 3,5 | 21.7 | 18.5 | 22.2 | 20.0 | 24.9 | 20.3 | 27.6 | 22.7 |
| 10–13 | 29.3 | 60.1 | 28.6 | 54.6 | 29.2 | 41.1 | 32.2 | 43.1 |
| 35 | 35.4 | 93.4 | 30.6 | 65.4 | 27.5 | 32.9 | 33.1 | 47.1 |
| 42 | 38.3 | 109.0 | 31.5 | 70.3 | 27.4 | 32.4 | 34.1 | 51.6 |
| 60–62 | 49.7 | 172.0 | 34.9 | 88.6 | 29.4 | 42.0 | 38.1 | 69.3 |

EXAMPLE VI

The following procedure demonstrates the post-treatment method of the invention. An unsaturated polyester resin system is formulated according to the procedures as generally set forth in Example II. The resin system has a viscosity and contains polyester binder and specific additive components in amounts as found in a commercially available proprietary polyester resin system sold under the trade designation K-1060-5 by Koppers Company, Inc. The resin system has an acid value of 16.8. Quadruplicate one-liter portions of the resin system are designated "untreated reference" batch and post-treated batches "A", "B" and "C". Fumaric acid in amounts of 1 percent, 3 percent and 5 percent by weight is added to each of batches "A", "B" and "C", respectively. The resin system-fumaric acid batches are rolled in closed containers for 8 hours and thereafter centrifuged; the supernatant liquid is decanted from the undissolved fumaric acid so as to remove the fumaric acid from contact with the resin systems. Acid values of 16.9 to 17.0 are measured for the treated batches. The untreated reference batch and the post-treated batches are stored under dark in closed containers at room temperature. Over a period of 62 days, gel times are measured at several intervals by subjecting samples of each of the batches to the aforementioned gel snap point determination method. Gel-time data are listed in Table VI. At the end of the test period, fumaric acid post-treatment is observed to reduce the average gel-time drift of the three treated batches to 81 percent of the drift of the untreated reference.

TABLE VI

Gel-Time Drift for Untreated and Fumaric Acid Post-Treated and Samples of Promoted Polyester Resin System (Example VI)

| Shelf Life (days) | Gel-time (min) | Drift From Initial (%) | Gel-time (min) | Drift From Initial (%) | Gel-time (min) | Drift From Initial (%) | Gel-time (min) | Drift From Initial (%) |
|---|---|---|---|---|---|---|---|---|
| 0.1 | 23.7 | — | 27.1 | — | 26.4 | — | 26.3 | — |
| 6,7 | 33.0 | 39 | 35.1 | 30 | 33.6 | 27 | 34.2 | 30 |
| 17 | 40.4 | 70 | 43.7 | 51 | 42.2 | 50 | 43.4 | 65 |
| 30 | 49.1 | 107 | 50.1 | 85 | 47.8 | 81 | 53.2 | 102 |
| 42,43 | 49.9 | 111 | 50.9 | 88 | 48.2 | 83 | 53.1 | 102 |

Although specific examples of the instant invention have been set forth hereinabove, it is not intended that the invention be limited solely thereto, but is to include all the variations and modifications falling within the scope of the appended claims.

What is claimed is:

1. A method for treating a curable polyester resin system to reduce gel-time drift of the resin system, which system comprises unsaturated polymerizable material which includes a polyester binder and, optionally, one or more soluble or insoluble additive components comprising an inhibitor, a promoter, an inert filler, a pigment, a dye, a thixotropic material, a reinforcement material, a flame retardant, a wax, and a lubricant, the method comprising the steps of:
   contacting a polyester binder of the resin system with an unsaturated acid selected from the group consisting of aliphatic mono- or polycarboxylic acid and an aromatic mono- or polycarboxylic acid in an amount and for a period of time effective to suppress gel-time drift for the useable shelf life of the resin system as compared to an untreated counterpart resin system; and
   removing undissolved acid from contact with the polyester resin binder.

2. The method of claim 1 wherein said contacting step comprises adding the acid to a polyester resin binder dissolved in an unsaturated monomer solution and thereafter mixing the acid and polyester resin binder solution to form a mixture.

3. The method of claim 2 wherein said step of removing undissolved acid is accomplished by pressure filtering the mixture of the acid and the polyester resin binder solution.

4. The method of claim 2 wherein said step of removing undissolved acid is accomplished by centrifuging the mixture of the acid and the polyester resin binder solution.

5. The method of claim 1 wherein the polyester resin system is a promoted resin system containing a promotor selected from the group consisting of a metal-containing compound and a metal-containing compound and an amine in combination.

6. The method of claim 5 wherein said metal containing compound is a cobalt-containing compound.

7. The method of claim 1 wherein the resin system comprises both curable polyester and one or more additive components for altering a physical or chemical property of the resin system, the polyester resin binder being contacted with the acid before introducing said one or more property-altering components into the resin system.

8. The method of claim 1 wherein the resin system comprises a curable polyester binder and one or more additive components for altering a physical or chemical property of the resin system, the polyester resin binder being contacted with the acid after introducing said one or more soluble property-altering components into the resin system.

9. The method of claim 1 wherein the aromatic mono- or polycarboxylic acid is an aromatic dicarboxylic acid.

10. The method of claim 9 wherein said aromatic dicarboxylic acid is phthalic acid.

11. The method of claim 1 wherein the unsaturated aliphatic mono- or polycarboxylic acid is an unsaturated aliphatic dicarboxylic acid of two to ten carbon atoms.

12. The method of claim 11 wherein said unsaturated aliphatic dicarboxylic acid is fumaric acid.

13. The method of claim 1 wherein said contacting step is accomplished by adding the acid to the polyester binder dissolved in an unsaturated monomer solution, the acid being added in an amount in a range from about 0.05 to about 5 weight percent of the polyester resin system.

14. The method of claim 13 wherein said contacting step further comprises mixing the acid with the polyester binder solution for a period of time in a range from about 0.1 to about 24 hours.

15. A method for formulating and treating an unsaturated polyester resin system to provide a curable resin system wherein gel-time drift is reduced relative to an untreated counterpart resin system, which system comprises unsaturated polymerizable material including a polyester binder and one or more soluble or insoluble additive components comprising an inhibitor, a promoter, an inert filler, a pigment, a dye, a thixotropic material, a reinforcement material, a flame retardant, a wax, and a lubricant, the method comprising the steps of:

(a) adding an unsaturated acid selected from the group consisting of aliphatic mono- or polycarboxylic acid or an aromatic mono- and polycarboxylic acid to a polyester binder dissolved in an unsaturated monomer solution to form a mixture containing the acid in an amount in a range from about 0.05 to about 5 weight percent of the polyester resin system;

(b) mixing the acid and solution of polyester binder for a period of time in a range from about 0.1 to about 24 hours; and (c) removing undissolved acid from the mixture;

whereby gel-time drift over the useful shelf life of the resin system is suppressed as compared to an untreated counterpart resin system.

16. The method of claim 15 wherein the polyester resin system is a promoted resin system containing a promotor selected from the group consisting of a metal-containing compound and a metal-containing compound and an amine in combination.

17. The method of claim 16 wherein said metal-containing compound is a cobalt-containing compound.

18. The method of claim 15 wherein said steps (a), (b), and (c) are performed before introducing said one or more property-altering components into the resin system.

19. The method of claim 15 wherein said steps (a), (b), (c) are performed after introducing said one or more soluble property-altering components into the resin system.

20. The method of claim 15 wherein the aromatic mono- or polycarboxylic acid is an aromatic dicarboxylic acid.

21. The method of claim 20 wherein said aromatic dicarboxylic acid is phthalic acid.

22. The method of claim 15 wherein the unsaturated aliphatic mono- or polycarboxylic acid is an unsaturated aliphatic dicarboxylic acid of two to ten carbon atoms.

23. The method of claim 22 wherein said unsaturated aliphatic dicarboxylic acid is fumaric acid.

24. The method of claim 15 wherein said mixing step is performed by stirring the acid-polyester binder mixture in a mixing apparatus.

25. The method of claim 15 wherein said removing step is accomplished by filtering the mixture of acid and the polyester resin binder solution.

26. The method of claim 15 wherein said removing step is accomplished by centrifuging the mixture of acid and the polyester resin binder solution.

27. A method for formulating and treating an unsaturated polyester resin system to provide a curable resin system wherein gel-time drift is reduced relative to an untreated counterpart resin system, comprising the steps of:

(a) forming a curable, unsaturated polyester resin system by mixing together an unsaturated polyester binder and a copolymerizable monomer, the polyester binder being present in an amount in a range from about 10 to about 99 weight percent of the resin system and the monomer being present in an amount in a range from about one to about 90 weight percent of the resin system;

(b) adding to the resin system an inhibitor in an amount in a range from about 0.001 to about 0.1 weight percent of the resin system and a promoter in an amount in a range from about 0.01 to about 1 weight percent of the resin system;

(c) adding to the resin system an unsaturated aliphatic mono- or polycarboxylic acid and an aromatic mono- or polycarboxylic acid in an amount in a range from about 0.5 to about 5 weight percent of the resin system;

(d) mixing the resin system; and (e) removing undissolved acid from the resin system;

whereby gel-time drift is reduced for the useable shelf life of the treated polyester resin system as compared to an untreated counterpart resin system.

28. The method of claim 27 wherein said removing step is accomplished by filtering the polyester resin system.

29. The method of claim 27 wherein said removing step is accomplished by centrifugation of the polyester resin system.

30. The method of claim 27 wherein the aromatic mono- or polycarboxylic acid is an aromatic dicarboxylic acid.

31. The method of claim 30 wherein said aromatic dicarboxylic acid is phthalic acid.

32. The method of claim 27 wherein said polycarboxylic acid is an unsaturated dicarboxylic acid of two to ten carbon atoms.

33. The method of claim 32 wherein said unsaturated dicarboxylic acid is fumaric acid.

* * * * *